DATA SET FOR POLAR CURRENT LOOP SIGNALING

Filed July 20, 1966 2 Sheets-Sheet 1

INVENTORS J. T. CARBONE
O. F. GERKENSMEIER
G. PARKER
BY R C Lipton
ATTORNEY 3,505,475

DATA SET FOR POLAR CURRENT LOOP SIGNALING

John T. Carbone, Astoria, and Otto F. Gerkensmeier and George Parker, New York, N.Y., assignors to Bell Telephone Laboratories, Incorporated, Murray Hill, N.J., a corporation of New York Filed July 20, 1966, Ser. No. 566,564
Int. Cl. H04m *11/06, 7/02*
U.S. Cl. 179—4 9 Claims

ABSTRACT OF THE DISCLOSURE

Interface conversion between station equipment and a two-wire line is provided by a half-duplex data set which converts DC data signals obtained from station terminals to polar loop current circulated around the two-wire line and converts incoming polar loop current to DC data signals. The loop current is detected by monitoring the magnitude and direction of current on each wire, summing the incoming current on one wire with the outgoing current on the other wire and inversely combining the currents thus summed, canceling out longitudinal earth currents. In addition to obtaining the DC data signal, the signal magnitude is also determined to indicate signal failure when the magnitude falls below a predetermined threshold.

Figure 1:
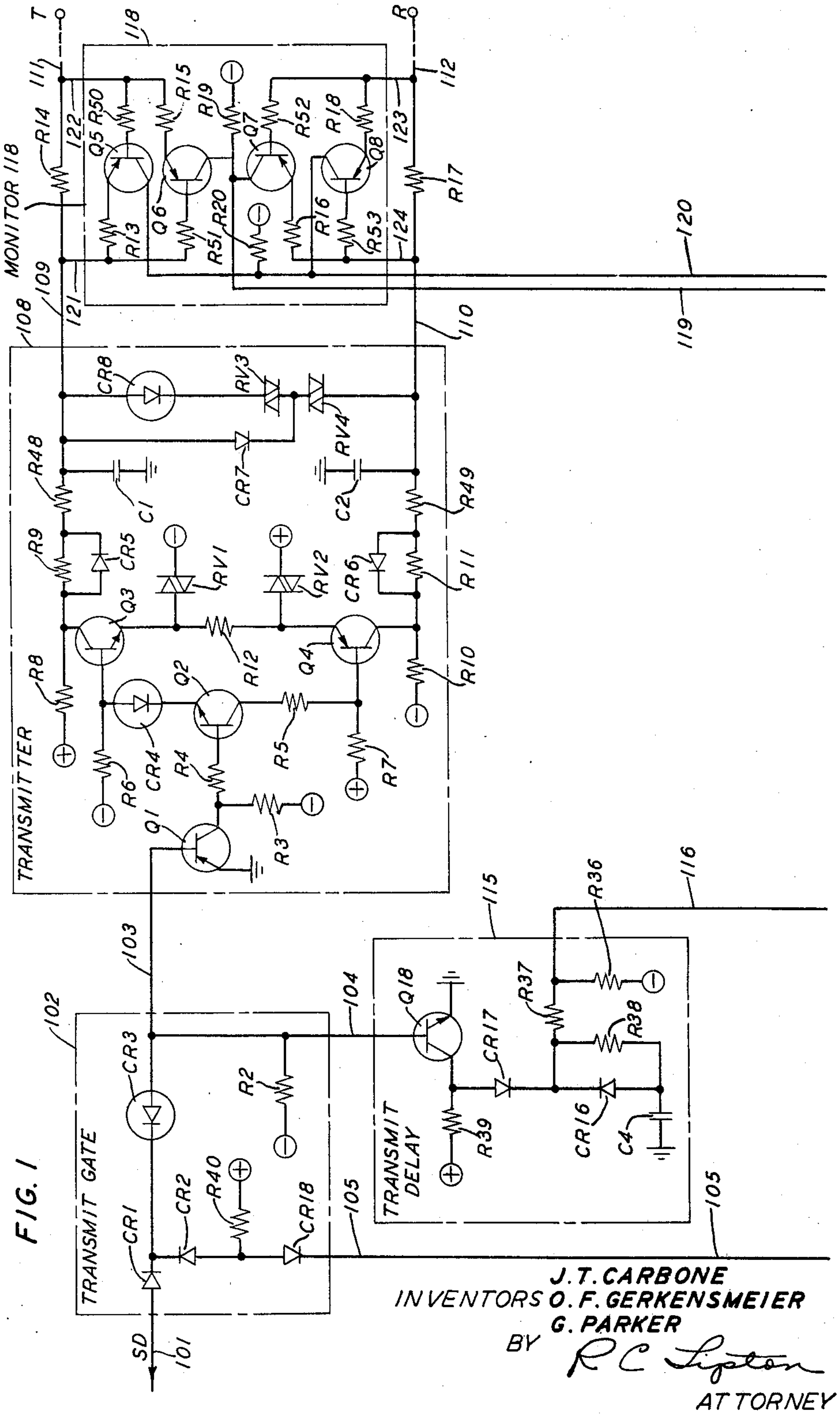

This invention relates to polar current loop signaling over two-wire communication lines and, more particularly, to polar signaling over lines subject to longitudinal currents due to differences in potential between the earth grounds at the remote ends of the line.

It is a broad object of this invention to provide an improved polar current loop signaling system over two-wire lines subject to longitudinal currents.

Low speed data sets communicating over short and medium haul telephone lines may employ voice frequency or direct current signaling techniques. The direct current signaling can involve alternate current-no current signals or polar current signals, the latter technique being produced through battery reversal wherein current circulates in one direction, such as clockwise, around the two-wire loop of the telephone line when marking current is being transmitted and circulates in the other direction when spacing current is being transmitted. This type of signaling is attractive for medium haul loops since the data sets do not require expensive reactive components required for voice transmission or the high current signals, which develop crosstalk, required for on-off type signaling.

The power supply of each data set is normally returned to earth ground at its own locality. It is well known that there may exist a potential difference between grounds creating a longitudinal current which flows along each leg of the telephone line from one data set to the other. Because the telephone line is balanced the flow is equal in each leg. Since signal current is loop current while ground current flows longitudinally, the longitudinal current adds to the loop current in one leg and subtracts, by an equal amount, in the other leg. Since polar signaling provides low current levels, longitudinal current can significantly reduce the signaling current in one wire of the loop. In addition, if the difference in ground potential becomes significant, the leg current may be reversed.

Accordingly, it is an object of this invention to determine the direction of loop signaling current over two-wire lines subject to longitudinal current.

It is another object of this invention to determine the magnitude of loop signaling current over two-wire lines subject to longitudinal current.

In accordance with an illustrative embodiment of this invention, polar loop signaling current circulating on a two-wire telephone line subject to longitudinal current is monitored by each data set receiver. Advantageously, the monitor detects the magnitude and direction of the current on each wire of the two-wire loop. The data set receiver then compares the current flow on the two legs of the loop. Recognizing that the signaling current circulates around the loop, appearing to flow into the data set on one wire and out of the data set on the other wire, and the longitudinal current flows equally in both legs either into or out of the data set, the data set receiver can determine the magnitude and direction of the loop signaling current.

It is a feature of this invention that the cumulative magnitude of the currents flowing into the data set in each leg and out of the data set in each opposing leg is determined to obtain indications of the levels of the circulating currents.

It is a feature of this invention that the receiver compares the level indications and determines the greater level to indicate the direction the signaling current is circulating on the line.

It is a feature of this invention that the receiver compares the difference between the level indications to indicate the magnitude of the signaling current. In accordance with the illustrative embodiment, when the level difference falls below a predetermined threshold, a signal failure on the line is indicated.

Figure 2:
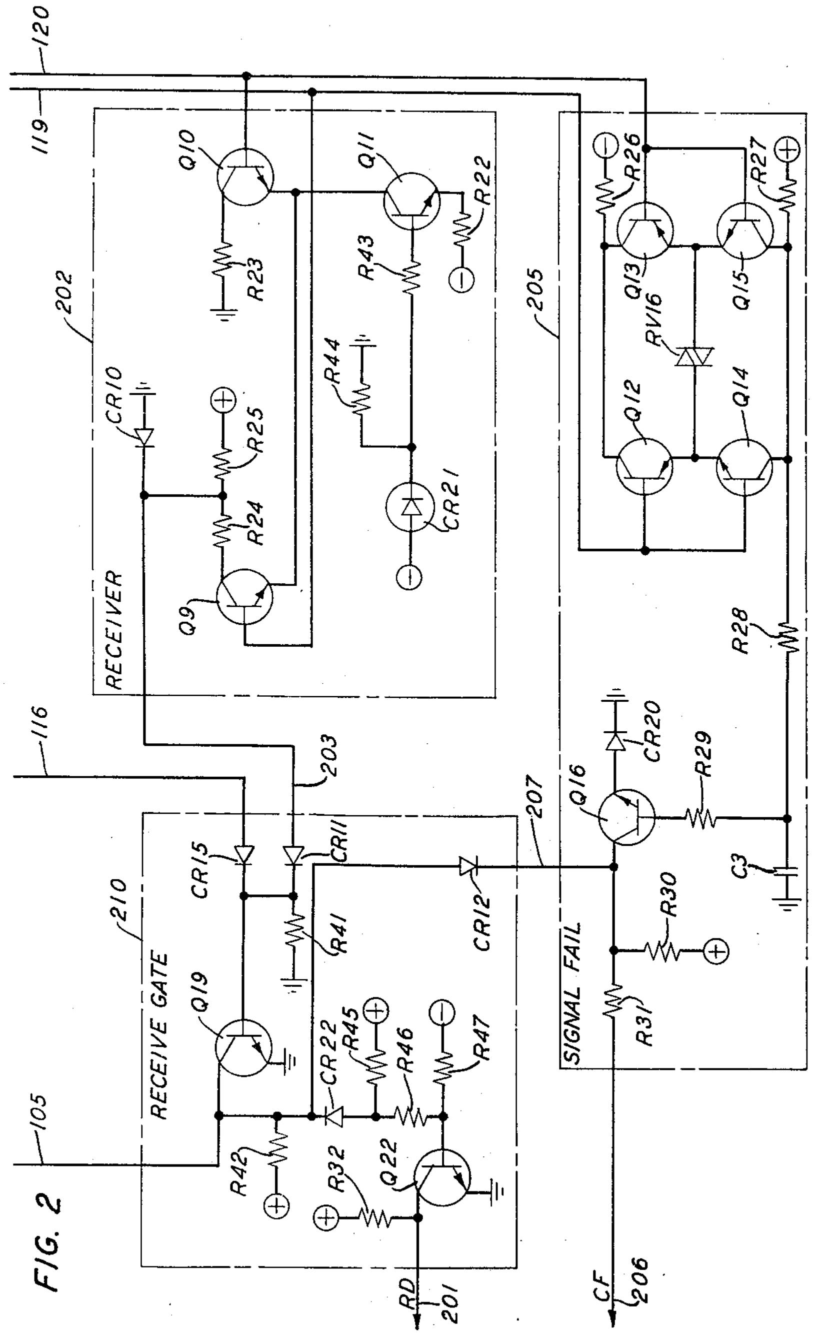

The foregoing and other objects and features of this invention will be fully understood from the following description of the illustrative embodiment taken in conjunction with the accompanying drawings wherein FIGS. 1 and 2, when arranged with FIG. 1 over FIG. 2 show the details of circuits and equipment which cooperate to form a data set for monitoring polar current loop signals in accordance with this invention.

Referring now to the drawings, the data set is shown connected to tip terminal T and ring terminal R of a telephone line, FIG. 1, by way of tip lead 111 and ring lead 112. The other side of the data set is connected to subscriber data equipment such as a teletypewriter by way of input or send lead 101 and output or receive lead 201, FIG. 2. A signal fail lead 206 is also connected to the subscriber data equipment.

In general, the data set is arranged for half duplex signaling over the telephone line, whereby data signals may be transmitted or received thereover so long as both sending and receiving do not occur concurrently. Data signals are received from the subscriber over lead 101, converted to polar loop current signals, and applied to the telephone line by way of tip lead 111 and ring 112. Polar loop current signals received from the telephone line by way of the tip ring are converted by the data set to conventional signal voltages for application to the subscriber data equipment by way of receive lead 201. In the event that a signal failure occurs on the telephone loop, an alarm signal is provided to lead 206 which extends to conventional alarm indicating apparatus in the subscriber equipment.

Considering now data signals received from the subscriber equipment, these signals are passed by way of lead 101 to a transmit gate generally indicated by block 102. Transmit gate 102 passes the signals by way of lead 103 to transmitter 108 and by way of lead 104 to transmit delay circuit 115, unless precluded by a signal over input lead 105 indicating an incoming "break" signal from the telephone line.

Assuming now that an incoming "break" signal is not being received from the telephone line, the signals provided by the subscriber equipment are passed by transmit gate 102 through lead 103 to transmitter 108. These data signals are converted to polar current loop signals and passed out to the telephone line. When a marking signal is received from the subscriber, transmitter 108 provides current to output lead 109, which current passes through resistor R14 and lead 111 to a terminal of the telephone line such as the tip terminal T, thence over the telephone loop and back to the ring terminal R and through lead 112, resistor R17 and lead 110 to transmitter 108. Conversely, transmitter 108 generates a spacing signal by passing current from lead 110 to lead 109 by way of the telephone loop.

As previously described, transmit gate 102 in addition to passing signals to transmitter 108 applies signals by way of lead 104 to transmit delay circuit 115. The function of transmit delay circuit 115 is to preclude loop around of signals back to the subscriber equipment as described hereinafter. In accordance therewith, transmit delay circuit 115 passes indications of incoming space signals on lead 104 to output lead 116 without intermediate delay. Indications of incoming marking signals, however, are passed to lead 116 with sufficient delay to correspond to the time for the preceding spacing signal to loop around to the data set output lead 201.

The detection of the signals on the telephone line is provided by a monitor generally indicated by block 118. The function of the monitor is to sense the direction and magnitude of the current in the telephone loop. Tip lead current is detected across resistor R14 by leads 121 and 122 while ring lead current is detected across resistor R17 by leads 123 and 124.

Incoming marking current flows in the same direction as the previously described outgoing marking signal current. This received current flows into the ring of the telephone line, passes through lead 112, resistor R17, lead 110, transmitter 108, lead 109, resistor R14, lead 111, and then back over the telephone loop via the tip terminal T. Incoming spacing current flows in the same direction as outgoing spacing current, arriving from the telephone loop by way of terminal T and returning via terminal R to the telephone loop.

Monitor 118, in response to the detection of marking current on the telephone line, applies a marking signal to output lead 120 and, in response to the detection of spacing current on the line, applies a spacing signal to output lead 119, the amplitude of the signals corresponding to the amplitude of the loop current on the line.

In accordance with the invention, the data set provides cancellation of longitudinal currents due to differences in earth potential between stations. As a result of these differences, current may flow over both line wires into the local data set from the remote station or may flow out from the local station over both line wires. Thus the incoming current over one wire may be increased and the outgoing current over the other wire simultaneously decreased or, conversely, the incoming current decreased and the outgoing current increased. Monitor 118 concurrently senses the marking or spacing current in both line wires and provides the appropriate signals to leads 119 and 120 in accordance with the cumulative current in both wires. Accordingly, the effect of the longitudinal current is cancelled.

Under some situations the differences of earth potential are great enough to generate longitudinal current which exceeds the signaling current. In this event, one wire of the telephone pair bears a maximum amount of current while the flow through the other is reversed, having an amplitude corresponding to the difference between the longitudinal and signaling currents. Thus monitor 118 concurrently applies a marking signal to lead 120 and a spacing signal to lead 119. Receiver 202, FIG. 2, compares the marking signal received from monitor 118 over lead 120 with the spacing signal received over lead 119 on a differential basis and determines the correct signal thereby. The corrected signal is passed by lead 203 to receive gate 210.

Signal fail circuit 205 checks the amplitude of the marking or spacing signal on leads 119 and 120 and provides an output indication to lead 206 in the event that the incoming telephone loop current falls below a predetermined threshold. Signal fail circuit 205 also provides a similar indication to receive gate 210 by way of lead 207.

As previously described, receive gate 210 has three inputs provided thereto. The input from transmit delay circuit 115 indicates whether an outgoing spacing signal is being transmitted. The signal provided by signal fail circuit 205 by way of lead 207 indicates signal failure of the telephone line. Finally, the marking and spacing signals detected by monitor 118 and the corrected signals thereof provided by receiver 202 are passed to receive gate 210 by way of lead 203. With these three inputs, receive gate 210 passes the signals from receiver 202 to the subscriber equipment by way of lead 201 in the event that there is no signal failure detected by signal fail circuit 205 and there are no incoming spacing signals from the subscriber on incoming lead 101 provided to transmit delay circuit 115, as previously described. In the event, however, that a signal failure occurs or that incoming spacing signals are being received from the subscriber equipment, the appropriate signals are received from leads 207 or 116 and output lead 201 is clamped to a marking condition. It is noted that receive gate 210 also includes output lead 105 which extends to transmit gate 102. As previously described, lead 105 indicates whether an incoming "break" signal is being received from the telephone line to preclude the outward transmission of signals from the subscriber equipment through transmit gate 102.

Considering now the details of the operations of the data set, the data signals applied to transmit gate 102 by the subscriber via lead 101 constitute positive voltages to correspond to the marking signals and ground potentials to correspond to the spacing signals. These data signals are passed to diode CR1 in transmit gate 102.

Diode CR1 together with diode CR2 combines to form an OR gate. Diode CR2, in turn, is connected to positive battery by way of resistor R40 and to lead 105 by way of diode CR18. As described in detail hereinafter, when the remote station is idle, lead 105 has ground applied thereto by receive gate 210. This ground is passed through diode CR18 to diode CR2. Diode CR2, however, is poled to preclude the passage of the ground potential therethrough. Consequently, during the normal idle marking condition of the remote data set no signal is passed through diode CR2. In the event, however, that the remote station sends a spacing "break" signal, a positive potential is applied to lead 105 as described hereinafter. The previously described ground potential is removed and a positive potential is passed through resistor R40 and diode CR2 to breakdown diode CR3.

As previously described, the application of a marking signal by the subscriber to lead 101 applies positive potential to diode CR1 which diode applies the positive potential therethrough to breakdown diode CR3. Accordingly, if a marking signal is applied by the subscriber to input lead 101, or if a spacing "break" signal is received from the data set, a positive potential is applied through diode CR1 or diode CR2 to breakdown diode CR3. Alternatively, if the signal applied to input lead 101 is not marking and the remote station is in the idle condition, neither diode CR1 nor diode CR2 applies a positive condition therethrough. Thus, no signal is applied to breakdown signal CR3 when the remote station is idle and the local subscriber applies a spacing signal to input lead 101.

The other side of breakdown diode CR3 extends to negative battery by way of resistor R2. Assuming now that a positive potential is applied by way of CR1 or diode CR2 to diode CR3, the difference in potential across diode CR3 breaks the diode down. As a consequence, the diode conducts and the incoming positive potential is passed therethrough to output lead 103 which extends to transmitter 108 and to output lead 104 which is connected to transmit delay circuit 115. Accordingly, upon the application of a marking signal by the subscriber or during the reception of signals from the remote station, diode CR3 breaks down passing a positive potential therethrough to transmitter 108 and transmit delay circuit 115. Conversely, when the remote station is not signaling and the local subscriber is applying a spacing signal to diode CR1, no signal is passed to diode CR3. In this event the potential across diode CR3 is insufficient to break it down. Consequently, diode CR3 does not conduct and a negative potential is applied to leads 103 and 104 by way of resistor R2.

Lead 103 is connected to the base of transistor Q1 in transmitter 108. The collector of transistor Q1 is connected in turn to the junction of resistors R3 and R4, which resistors are connected in series between negative battery and the base of transistor Q2. The emitter of transistor Q2 is connected to the base of transistor Q3 by way of breakdown diode CR4, and the collector of transistor Q2 is connected to the base of transistor Q4 by way of resistor R5.

Assuming now that lead 103 is rendered positive as a result of a mark signal from the subscriber or incoming signals from the remote station, transistor Q1 as a consequence thereof is turned off. This passes negative battery to the base of transistor Q2 by way of resistor R3 and resistor R4 thus turning transistor Q2 off. With transistor Q2 turned off negative battery is passed to the base of transistor Q3 by way of resistor R6 and positive battery is passed to the base of transistor Q4 by way of resistor R7. Accordingly, during a marking condition transistors Q3 and Q4 are turned off.

With transistors Q3 and Q4 in the off condition, positive battery is passed by way of resistor R8, diode CR5, resistor R48, diode CR7, reversely poled diodes RV4, resistor R49, diode CR6 and resistor R10 to negative battery. In addition, with output leads 109 and 110 of transmitter 108 connected across diode CR7 and reversely poled diodes RV4, the telephone line provides a shunting current path whereby current is also passed by way of resistor R14 and lead 111 into the tip terminal of the telephone line and thence back over the ring terminal, lead 112, resistor R17 and lead 110. It is noted that the voltage drop across the telephone line is determined by diode CR7 and reversely poled diodes RV4. Since the volt drop across these diodes is fixed, the marking current passed to the telephone line is correspondingly fixed. Thus, with the data set in a marking condition, a fixed amount of marking current is passed into the tip terminal out over the telephone loop and back into the ring terminal of the telephone line.

Assuming now that a spacing condition is to be transmitted, lead 103 goes to a negative potential as previously described and transistor Q1 consequently is turned on. This applies ground to the collector thereof and thence to the base of transistor Q2 by way of resistor R4. With the emitter of transistor Q2 connected to negative battery by way of breakdown diode CR4 and resistor R6, and in parallel to resistor R6, the path consisting of the base emitter junction of Q3 and RV1, the ground on the base thereof turns the transistor on. The collector potential of transistor Q2 is thereby lowered, lowering in turn the potential applied to the base of transistor Q4 thus turning transistor Q4 on. In addition, with transistor Q2 conducting, the emitter thereof follows the rising potential applied to its base providing sufficient potential across diode CR4 to break it down. As a consequence, the potential on the base of transistor Q3 rises turning this transistor on. Accordingly, in the spacing condition transistors Q3 and Q4 are turned on and a current path is provided from positive battery through reversely poled diode RV2, the emitter to collector path of transistor Q4, resistors R11 and R49, reversely poled diodes RV4 and RV3, breakdown diode CR8, resistors R48 and R9, the collector to emitter path of transistor Q3, and reversely poled diodes RV1 to negative battery.

Spacing current is also passed by way of output lead 110 to the ring terminal of the telephone line and thence back over the tip terminal to lead 109. In this case reversely poled diodes RV3 and RV4 and breakdown diode CR8 are across the telephone line. The cumulative potentials across these diodes are fixed to be three times the voltage drop provided by diode CR7 and diode RV4 when marking current is provided. Consequently, the spacing current, by virtue of this fixed potential across reversely poled diodes RV3 and RV4 and breakdown diode CR8 is three times the quantity of the marking current.

It is noted that the remote data set may be arranged substantially identically to the local set wtih the exception that the tip and ring terminals are reversed. Accordingly, with the local station signaling and the remote set in the idle condition for half-duplex operation, when marking current is applied to the line by both stations this current flows over the line in the same direction, resulting in a cumulative amount of current that is twice the current produced by either station individually. Conversely, when the local station provides spacing current to the telephone line, this is in opposition to the marking current produced by the remote station. Since the spacing current is in opposition to the remote marking current, the resultant current constitutes the difference between the two quantities. However, spacing current comprises three times the marking current as previously described. Thus, the difference is a quantity equal to twice the marking current but in the reverse direction. Accordingly, the quantity of spacing current flowing through the line when a spacing signal is transmitted equals the quantity of the marking current on the telephone line when marking is transmitted.

As previously described, monitor 118 detects the quantity and direction of the signaling current on the telephone line. Assuming now that marking current flows on the line, this current, as previously described, flows from lead 109 through resistor R14 and lead 111 to the tip terminal, and from the ring terminal through lead 112 and resistor R17 to lead 110. Lead 109 is connected by way of lead 121 and resistor R13 to the emitter of transistor Q5 in monitor 118. Lead 111 is connected by way of lead 122 and resistor R50 to the base of transistor Q5. Accordingly, with marking current on the telephone line the potential drop across resistor R14 renders the base of transistor Q5 negative with respect to its emitter, thus turning this transistor on.

The conduction of transistor Q5 is, of course, controlled by the amount of the potential drop across resistor R14 which, in turn, is determined by the quantity of marking current. Accordingly, the quantity of marking current flowing through resistor R14 into the line controls the collector current of transistor Q5. With the collector of transistor Q5 connected to negative battery by way of resistor R20 and also connected to output lead 120, the portion of the voltage on lead 120 determined by transistor Q5 varies with the amount of marking current through resistor R14. Thus the voltage potential on lead 120 due to transistor Q5 rises as the conduction of transistor Q5 increases in response to increase in marking current starting from a negative potential, provided via resistor R20 when transistor Q5 is off, to a relatively positive potential provided by the voltage drop across resistor R20 when transistor Q5 is on.

Lead 109 is also connected by way of lead 121 and resistor R51 to the base of transistor Q6. The emitter of transistor Q6 is connected to lead 111 by way of resistor R15 and lead 122. Spacing current across resistor R14 thus provides a potential drop rendering the base of transistor Q6 negative with respect to its emitter. Accordingly, spacing current turns on transistor Q6 and the transistor provides collector current which increases as the spacing current from the line through resistor R14 increases.

Since the collector of transistor Q6 is connected to negative battery by way of resistor R19 and, in addition, is connected to output lead 119, the potential on lead 119 rises from a negative to a relatively positive potential as the spacing current through resistor R14 increases.

Monitor 118 also detects the marking and spacing currents through resistor R17. Marking current is detected by transistor Q8 whose base is connected to lead 110 by way of resistor R53 and lead 124. The emitter of transistor Q8 is connected through resistor R18 and lead 123 to lead 112. Thus, marking current through resistor R17 turns transistor Q8 on. With the collector of transistor Q8 connected to lead 120 and also connected through resistor R20 to negative battery, the marking current through resistor R17 and the consequent increase in the collector current of transistor Q8 increases the potential on lead 120. It is recalled that the marking current through resistor R14 also increases the potential on lead 120. Accordingly, transistors Q5 and Q8 of monitor 118 detect the marking current through resistor R14 and R17 and, in response thereto, additively provide positive potentials to lead 120.

Spacing current through resistor R17 is detected by transistor Q7. The emitter of transistor Q7 is connected through resistor R16 and lead 124 to lead 110. The base of transistor Q7 is connected through resistor R52 and lead 123 to lead 112. Accordingly, spacing current through resistor R17 turns transistor Q7 on, the conduction of the transistor varying with the amount of spacing current through resistor R17. Since the collector of transistor Q7 is connected to lead 119 the potential on lead 119 rises as the spacing current through resistor R17 increases. It is recalled that transistor Q6 drives lead 119 positive in response to spacing current through resistor R14. Accordingly, transistors Q6 and Q7 detect spacing current through resistors R14 and R17, respectively, and additively drive lead 119 positive in accordance with the quantity of the detected spacing current through the telephone line.

As previously described, the difference in ground potential between the two stations may provide longitudinal current on the line. Since the longitudinal current is equal for both sides of the line and is either outgoing or incoming on both sides, the resultant signaling current on one side is increased, while the signaling current on the other side is correspondingly decreased. This has the effect, however, of increasing the conduction of one detecting transistor in monitor 118 while decreasing the conduction of the other. Accordingly, the cumulative collector currents for the two transistors will, when added together, remain the same and the potentials on leads 119 and 120 are not affected.

If the potential difference between the data sets becomes large enough the longitudinal current on one leg of the line may become great enough to reverse the current through the leg. In this event the current through the other leg drives the detecting transistor toward saturation. The potentials on both of leads 119 and 120 under this condition are increased. However, the transistor driven toward saturation will drive the corresponding output lead 119 or 120 toward a high positive condition. Although the potential on the other one of the leads is also increased, the difference in potential between the leads will be maintained constant.

Output leads 119 and 120 extend to receiver 202 and to signal fail circuit 205. Considering receiver 202, lead 119 extends therein to the base of transistor Q9 and lead 120 is connected to the base of transistor Q10. Transistors Q9 and Q10 compare the voltages developed on leads 119 and 120. Since the emitters of transistors Q9 and Q10 are commonly connected through a constant current source comprising the collector to emitter path of transistor Q11, which transistor provides sufficient current for either one but not both transistors Q9 and Q10, the latter transistors are therefore connected as a differential amplifier.

Assuming that marking current is on the telephone line, monitor 118 renders lead 120 positive, as previously described. This turns transistor Q10 on and transistor Q9 off. With transistor Q9 rendered nonconducting, positive battery is passed through resistor R25 to output lead 203. Accordingly, the detection of marking current on the telephone line applies a positive condition through output lead 203 to receive gate 210.

In the event that monitor 118 detects spacing current on the line, lead 119 is rendered positive as previously described. Transistor Q9 is thus turned on bringing down the potential on its collector, the collector current sufficiently increasing to draw current from ground through diode CR10 and resistor R24. Accordingly, the potential on lead 203 is brought down to ground in response to the detection of spacing current on the telephone line.

Assuming now that longitudinal current on the telephone line renders both lead 119 and 120 positive, and further assuming that the current on the telephone line is predominantly marking, a slight increase in potential is applied to lead 119 and a substantially greater increase in potential is applied to lead 120. Transistor Q10, therefore, tends to conduct heavily, while transistor Q9 would tend to conduct slightly. However, the heavy conduction of transistor Q10 starves transistor Q9 since the only current path for the two transistors is the collector to emitter path of transistor Q11, as previously described. Accordingly, transistor Q9 turns off and a positive potential is applied to lead 203 indicating marking current on the telephone line. Conversely, if the spacing current on the telephone line predominates, transistor Q9 conducts heavily, precluding the conduction of transistor Q10 and ground is applied to receive gate 210 by way of lead 203. Accordingly, receiver 202 compares the potentials on leads 119 and 120 to determine which current signal on the telephone line predominates and applies the correct signal via lead 203 to receive gate 210.

As previously described, leads 119 and 120 also extend to signal fail circuit 205. Considering signal fail circuit 205 in detail, it is seen that lead 120 extends to the bases of transistors Q13 and Q15 and lead 119 extends to the bases of transistors Q12 and Q14. Transistors Q12 through Q15, together with reversely poled diodes RV16, form a bridge circuit for detecting the difference in voltage potentials applied to leads 119 and 120 and, more specifically, for determining whether this potential difference exceeds a predetermined threshold.

Assuming now that marking current is received from the telephone line, the potential on lead 120 goes positive with respect to the potential on lead 119 as previously described. With the voltage on lead 120 relatively positive and the voltage on lead 119 negative, transistors Q12 and Q15 tend to turn on. As a result thereof the emitters of transistors Q12 and Q15 follow the voltages on leads 119 and 120, respectively. In the event that the difference between the voltages on the emitters as developed by the two leads 119 and 120 exceeds the potential drop required across reversely poled diodes RV16 to cause them to conduct, then a current path will be provided from positive battery through resistor R27, the collector to emitter path to transistor Q15, reversely poled diodes RV16, the emitter to collector path of transistor Q12 and resistor R26 to negative battery. Accordingly, the collector of transistor Q15 goes negative, which negative potential is applied by way of resistors R28 and R29 to the base of transistor Q16. Accordingly, in the event that the marking current signal exceeds the predetermined threshold, transistor Q16 is maintained nonconductive.

If spacing current is received from the telephone line the potential on lead 119 exceeds the potential on lead 120, as previously described. Accordingly, transistors Q14 and Q13 tend to conduct with their emitters following the voltages on leads 119 and 120, respectively. If the difference between these emitter voltages exceeds the potential necessary to render reversely poled diodes RV16 conductive, then a current path is provided through the collector to emitter path of transistor Q14, reversely poled diodes RV16 and the emitter to collector path of transistor Q13. Accordingly, the collector potential of transistor Q14 is lowered and this lowered potential is passed to the base of transistor Q16. Thus, as long as the potential difference of the voltages on leads 119 and 120 exceeds a predetermined threshold, transistor Q16 is maintained nonconductive.

It is noted that capacitor C3 is connected between grounds and the junction of resistors R28 and R29. This is to provide sufficient delay to preclude the turning on of transistor Q16 during the mark-to-space or space-to-mark transition of the current signal on the telephone line.

With transistor Q16 nonconductive, positive battery is passed through resistor R30 and resistor R31 to lead 206. Lead 206 comprises the signal fail lead which extends to the subscriber equipment, which equipment provides an indication of proper signaling conditions when lead 206 has a positive potential applied thereto. The collector of transistor Q16 also extends by way of lead 207 to receive gate 210. Lead 207 is correspondingly in the positive condition when the signals on the telephone line are of proper amplitude.

Assuming now that the current signals on the telephone line fall below a predetermined threshold, indicating a signal failure, the consequent difference in voltage potentials between leads 119 and 120 are insufficient to concurrently turn on either transistors Q12 and Q15 or transistors Q13 and Q14. Accordingly, positive battery now passes through resistors R27, R28 and R29 to the base of transistor Q16. Thus, open a signal failure in the telephone line, transistor Q16 conducts and with the emitter thereof connected to ground by way of diode CR20 the potential on the collector is lowered to ground. Accordingly, in response to a signal failure on the telephone line, ground is applied to receive gate 210 by way of lead 207 and to signal fail lead 206 by way of resistor R31. The subscriber equipment, in response to ground on lead 206, may be arranged to indicate to the subscriber that a signal failure is occurring on the telephone line.

As previously described, the subscriber signaling provided at the output of transmit gate 102 is precluded from being returned to the subscriber through the utilization of transmit delay circuit 115. When the subscriber sends a spacing signal, output lead 104 at the output of transmit gate 102 goes negative, and this negative potential is passed to the base of transistor Q18 in transmit delay circuit 115. Transistor Q18 is therefore turned off and positive battery is passed to the collector thereof by way of resistor R39. This positive potential is passed through diode CR17 and resistor R37 to output lead 116 of transmit delay circuit 115. Lead 116 is connected to receive gate 210, functioning to block receive gate 210, as described hereinafter, when a positive potential is applied thereto. Accordingly, is previously described, a positive potential is applied to lead 116 to block receive gate 210 when the subscriber applies a spacing signal to transmit gate 102 by way of input lead 101.

The positive potential applied to lead 116 through diode CR17 is also passed to the upper plate of capacitor C4, as shown in FIG. 1, by way of resistor R38. Accordingly, when the subscriber sends a spacing signal, capacitor C4 is charged by the positive potential applied through resistor R39, diode CR17 and resistor R38.

Assuming now that the signal from the subscriber goes marking, the potential on lead 104 goes positive, as previously described. With a positive potential on lead 104 transistor Q18 conducts applying ground to the collector thereof. The positive potential previously applied through diode CR17 is therefore removed and negative battery tends to be applied by way of resistor R36 to lead 116. The application of this negative battery is delayed, however, by the charge on capacitor C4. The delay time is determined, in part, by the interval required for capacitor C4 to discharge through diode CR16, resistor R37, and resistor R36 to negative battery. During the discharge interval, however, lead 116 is maintained positive. This is to provide for the delay in the loop-around of the spacing signal, that is, the interval required for the signal to arrive at the telephone line via transmitter 108, be detected by monitor 118 and passed to receive gate 210 by way of receiver 202 as previously described. Accordingly, for an interval after the termination of the spacing signal from the subscriber, receive gate 210 is maintained blocked by the discharging of capacitor C4. Thereafter negative battery is applied by way of resistor R36 to lead 116 removing the block on receive gate 210. Any subsequent spacing signal from the subscriber re-establishes the positive potential condition through diode CR17 to lead 116, as previously described, which positive condition is applied thereto without delay. In addition, capacitor C4 is again charged, whereby removal of the spacing signal does not remove the signal block on receive gate 210 until capacitor C4 discharges.

As previously described, three input leads extend to receive gate 210, namely, lead 203 from receiver 202, lead 116 from transmit delay circuit 115, and lead 207 from signal fail circuit 205. Leads 116 and 203 extend to diodes CR15 and CR11, respectively, in receive gate 210. Diodes CR15 and CR11 are connected in common to the base of transistor Q19 and form an OR gate for signals on leads 116 and 203.

Assuming first that the subscriber is sending, spacing signal lead 116 goes positive as previously described, and the positive potential thereon is passed by way of diode CR15 to the base of transistor Q19, turning the transistor on. Alternately, in the event that a marking signal is detected on the telephone line by monitor 118, receiver 202 provides a positive potential to lead 203 as previously described. The positive potential on lead 203 is passed by way of diode CR11 to the base of transistor Q19 similarly turning the transistor on. Accordingly, transistor Q19 is turned on in the event that the subscriber sends a spacing signal or monitor 118 detects a marking signal on the telephone line. Thus transistor Q19 conducting indicates a marking condition.

With transistor Q19 conducting, ground is applied to the collector thereof, removing the positive potential normally applied thereto by way of resistor R42. This ground is passed by way of diode CR22 to the junction of resistors R45 and R46, thus removing the positive battery normally applied through resistor R45. With the other terminal of resistor R46 connected to the base of transistor Q22 and also connected to negative battery by way of resistor R47, the application of ground through diode CR22 lowers the potential on the base of transistor Q22 to turn the transistor off. With transistor Q22 thus turned off, positive battery passes to lead 201 by way of resistor R32. Thus, with transistor Q19 conducting, indicating an incoming marking condition, a positive potential is passed to receive lead 201 to pass a marking signal to the subscriber.

Transistor Q19 of receive gate 210 conducts in response to an incoming marking signal on a blocking condition provided by transmit delay circuit 115, as previously described. The consequent ground on the collector of transistor Q19, in addition to being applied to diode CR22, is passed to lead 105. As previously described, lead 105 extends to diode CR18 in transmit gate 102. This ground is applied through diode CR18 and thereafter blocked by diode CR2. As described heretofore, this indicates that a signal is not being received from the telephone line permitting the subscriber to send through transmit gate 102.

In the event that transmit delay circuit 115 is not blocking receive gate 210, and further in the event that a spacing signal is being detected by monitor 118, both leads 116 and 203 are in the negative potential condition, as previously described. Accordingly, the positive potential applied to the base of transistor Q19 is removed and the transistor turns off. As a consequence thereof, positive battery is passed through resistor R42 to the collector of transistor Q19. Ground is therefore no longer applied through diode CR22 permitting the passage of positive battery through resistors R45 and R46 to the base of transistor Q22. Transistor Q22 therefore turns on, bringing the potential at the collector thereof down to ground. This ground is passed to receive lead 201 and thence to the subscriber indicating the detection of a spacing signal on the telephone line.

With transistor Q19 nonconductive when spacing current is detected on the telephone line, and the consequent application of positive battery to its collector as previously described, this positive battery is passed to lead 105 and thence to transmit gate 102. As previously described, the application of positive battery to transmit gate 102 by way of lead 105 blocks transmit gate 102 by maintaining its output leads 103 and 104 in the positive marking condition. Accordingly, the detection of spacing current on the telephone line in the absence of a generated blocking condition by transmit delay circuit 115 results in a positive condition on lead 105 to clamp output leads 103 and 104 of transmit gate 102 in the positive marking condition.

In the event that a signal failure is detected on the telephone line, a simulated marking condition is applied to receive gate 210. As previously described, an response to a signal failure ground is applied to output lead 207 of signal fail circuit 205. This ground is passed by way of lead 207 to receive gate 210, and thence by way of diode CR12 to the junction of diode CR22 and resistor R42. Accordingly, ground is passed through diode CR22 turning off transistor Q22, as previously described, whereby a simulated marking condition is passed to receive lead 201. Thus, receive lead 201 goes to a positive marking condition in response to a signal failure on the telephone line.

Although a specific embodiment of this invention has been shown and described, it will be understood that various modifications may be made without departing from the spirit of this invention and within the scope of the appended claims.

What is claimed is:

1. A monitor for detecting polar signal current circulating around a two-wire loop communication line subject to longitudinal current comprising first means for sensing the magnitude and polarity of current on one of said wires of said two-wire loop, second means for sensing the magnitude and polarity of current on the other one of said wires of said two-wire loop, and receiving means for algebraically combining the currents of the same polarity sensed by said first and second sensing means for producing an indication of the magnitude and polarity of said signal current circulating around said two-wire loop.

2. A monitor for detecting polar current in accordance with claim 1 wherein said first sensing means includes means for detecting the magnitude of incoming current and means for detecting the magnitude of outgoing current on said one wire, and said second sensing means includes means for detecting the magnitude of incoming current and means for detecting the magnitude of outgoing current on said other wire.

3. A monitor for detecting polar current in accordance with claim 2 wherein said receiving means includes means for summing the outputs of said one-wire incoming current detecting means and said other wire outgoing current detecting means.

4. A monitor for detecting polar current in accordance with claim 3 wherein said receiving means further includes other means for summing the outputs of said one-wire outgoing current detecting means and said other wire incoming current detecting means, and output signal generating means for comparing the said sums provided by said summing means and said other summing means on a differential basis.

5. A monitor for detecting polar current in accordance with claim 1 wherein said first sensing means includes means for detecting the magnitude of incoming current on said one wire, said second sensing means includes means for detecting the magnitude of incoming current on said other wire, and said receiving means includes means for comparing the outputs of said one wire detecting means and said other wire detecting means and producing a signal indicating said detecting means output having the greatest magnitude.

6. A monitor for detecting polar current in accordance with claim 1 wherein said first sensing means includes means for detecting the magnitude of outgoing current on said one wire, said second sensing means includes means for detecting the magnitude of outgoing current on said other wire, and said receiving means includes means for comparing the outputs of said one wire detecting means and said other wire detecting means and producing a signal indicating said detecting means output having the greatest magnitude.

7. A monitor for detecting polar current circulating around a two-wire loop communication line comprising, first means for detecting incoming current on one of said wires and outgoing current on the other one of said wires of said two-wire loop and for generating a signal output having a level corresponding to the cumulative magnitudes of said detected currents, second means for detecting outgoing current on said one wire and incoming current on said other wire and for generating a signal output having a level corresponding to the cumulative magnitudes of said currents detected thereby, and receiving means for comparing said output levels of said first means and said second means.

8. A monitor for detecting polar current in accordance with claim 7 wherein said receiving means further includes means for producing a signal indicating said first and second means output having the greater signal level.

9. A monitor for detecting polar current in accordance with claim 7 wherein said receiving means further includes means for producing a signal indicating the difference between said first and second means output signal levels.

References Cited

UNITED STATES PATENTS

| | | | |
|---|---|---|---|
| 1,296,613 | 3/1919 | Bell | 178—58 |
| 2,133,832 | 10/1938 | Pullis | 178—59 |
| 2,310,279 | 2/1943 | Dahlbom et al. | 178—58 |
| 2,338,405 | 1/1944 | Cash et al. | 178—69 |
| 2,561,401 | 7/1951 | Morris et al. | 178—20 |
| 2,623,916 | 12/1952 | Welz | 324—140 |

OTHER REFERENCES

Standard Handbook for Electrical Engineers, 9th ed., McGraw-Hill Book Co., Inc., p. 2128, 1957.

WILLIAM C. COOPER, Primary Examiner

ALBERT B. KIMBALL, Jr., Assistant Examiner

U.S. Cl. X.R.

178—58, 69; 179—175.3; 324—51